(12) United States Patent
Hagedorn et al.

(10) Patent No.: US 10,232,788 B1
(45) Date of Patent: Mar. 19, 2019

(54) STORAGE BIN (71) Applicant: Ford Global Technologies, LLC, Dearborn, MI (US)

(72) Inventors: Gregory Hagedorn, Bloomfield Hills, MI (US); Kevin Wayne Preuss, Berkley, MI (US); Steven Camago, Clinton Township, MI (US); Jimmy Moua, Canton, MI (US); Johnathan Andrew Line, Northville, MI (US); Adam Ewel, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/705,805

(22) Filed: Sep. 15, 2017

(51) Int. Cl.
*B60R 7/04* (2006.01)
*B60N 2/02* (2006.01)

(52) U.S. Cl.
CPC ............... *B60R 7/043* (2013.01); *B60N 2/02* (2013.01)

(58) Field of Classification Search
CPC ...................................................... B60R 7/043
USPC ...................................................... 296/37.15
See application file for complete search history.

(56) References Cited

U.S. PATENT DOCUMENTS

| 5,816,650 | A | 10/1998 | Lucas, Jr. | |
|---|---|---|---|---|
| 5,902,009 | A | 5/1999 | Singh et al. | |
| 6,106,044 | A | 8/2000 | Schlachter | |
| 6,161,896 | A | 12/2000 | Johnson et al. | |
| 6,386,612 | B2 | 5/2002 | Hofmann et al. | |
| 6,508,508 | B1* | 1/2003 | Bargiel | B60N 2/793 297/188.16 |
| 8,770,661 | B2 | 7/2014 | Kalergis et al. | |
| 9,481,310 | B2 | 11/2016 | Chawlk et al. | |
| 9,950,674 | B1* | 4/2018 | Kalergis | B60N 2/3009 |
| 2002/0005649 | A1* | 1/2002 | Hofmann | B60R 7/043 296/37.15 |
| 2004/0149791 | A1* | 8/2004 | Tuel, Jr. | B60R 7/043 224/275 |
| 2008/0157556 | A1* | 7/2008 | Henderson | B60R 5/00 296/37.6 |
| 2008/0272630 | A1* | 11/2008 | Sturt | B60N 2/64 297/188.07 |
| 2013/0038080 | A1* | 2/2013 | Tate, Jr. | B60R 7/005 296/37.5 |
| 2013/0313869 | A1* | 11/2013 | Aguirre | B60R 7/043 297/188.09 |
| 2016/0200258 | A1* | 7/2016 | Chawlk | B60R 7/043 296/37.14 |
| 2018/0056882 | A1* | 3/2018 | Osterhoff | B60N 2/682 |

* cited by examiner

*Primary Examiner* — Jason S Morrow
(74) *Attorney, Agent, or Firm* — Vichit Chea; Price Heneveld LLP (57) ABSTRACT

A vehicle seating assembly includes a seat that is pivotable between an open position and a closed position. A cavity is formed in a support structure of the seat such that an occupant is supported on a support rib.

14 Claims, 8 Drawing Sheets

STORAGE BIN

FIELD OF THE DISCLOSURE

The present disclosure generally relates to a storage bin. More specifically, the present disclosure relates to a storage bin in a vehicle.

BACKGROUND OF THE INVENTION

Many vehicles are equipped with a rear row of seats. The seating assemblies utilized in vehicles often have unused or underutilized space under the cushions of the rear row of seats. Accordingly, there is a need for vehicle seating assemblies that provide additional functionality to the vehicle.

SUMMARY OF THE INVENTION

According to a first aspect of the present disclosure, a vehicle seating assembly includes a seat that is pivotable between open and closed positions. A cavity formed in a support structure of the seat and defining a support rib such that an occupant is supported on the support rib.

Embodiments of the first aspect of the present disclosure can include any one or a combination of the following features:
  the support rib is positioned directly below a projected center of mass of the occupant;
  the vehicle seating assembly further includes a hinge assembly that operably couples the seat to a seat frame;
  the hinge assembly further includes channels and support wires that travel within the channels as the seat transitions between the open and closed positions;
  the channels of the hinge assembly are integrally formed with the seat;
  the support rib further includes a skin that is grained with a predetermined pattern;
  the seat further includes a supplemental storage area in an underside of the seat;
  the seat extends over a front wall of the cavity when the seat is in the closed position; and
  the vehicle seating assembly further includes a prop bar operably coupled to the seat, wherein the prop bar automatically deploys when the seat is placed in the open position such that the seat remains in the open position.

According to a second aspect of the present disclosure, a vehicle seating assembly includes a seat that is pivotable between open and closed positions. One or more compartments in the seat are created by removing at least a portion of a support structure of the seat, thereby reducing the support structure to one or more support ribs.

Embodiments of the second aspect of the present disclosure can include any one or a combination of the following features:
  the support ribs are positioned such that at least one support rib is directly below a projected center of mass of an occupant;
  the vehicle seating assembly further includes a hinge assembly that operably couples the seat to a seat frame;
  the hinge assembly further includes channels and support wires that travel within the channels as the seat transitions between the open and closed positions;
  the channels of the hinge assembly are integrally formed with the seat; and
  the support ribs further include a skin that is grained with a predetermined pattern.

According to a third aspect of the present disclosure, a vehicle seating assembly includes a seat that is pivotable between open and closed positions. The vehicle seating assembly further includes a support structure. A cavity is created by removing at least a portion of the support structure thereby reducing the support structure to one or more support ribs. The one or more support ribs have a skin that is grained with a predetermined pattern.

Embodiments of the third aspect of the present disclosure can include any one or a combination of the following features:
  the support ribs are positioned such that at least one support rib is directly below a projected center of mass of an occupant;
  the vehicle seating assembly further includes a hinge assembly that operably couples the seat to a seat frame;
  the hinge assembly further includes channels and support wires, wherein the support wires travel within the channels as the seat transitions between the open and closed positions; and
  the channels of the hinge assembly are integrally formed with the seat.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
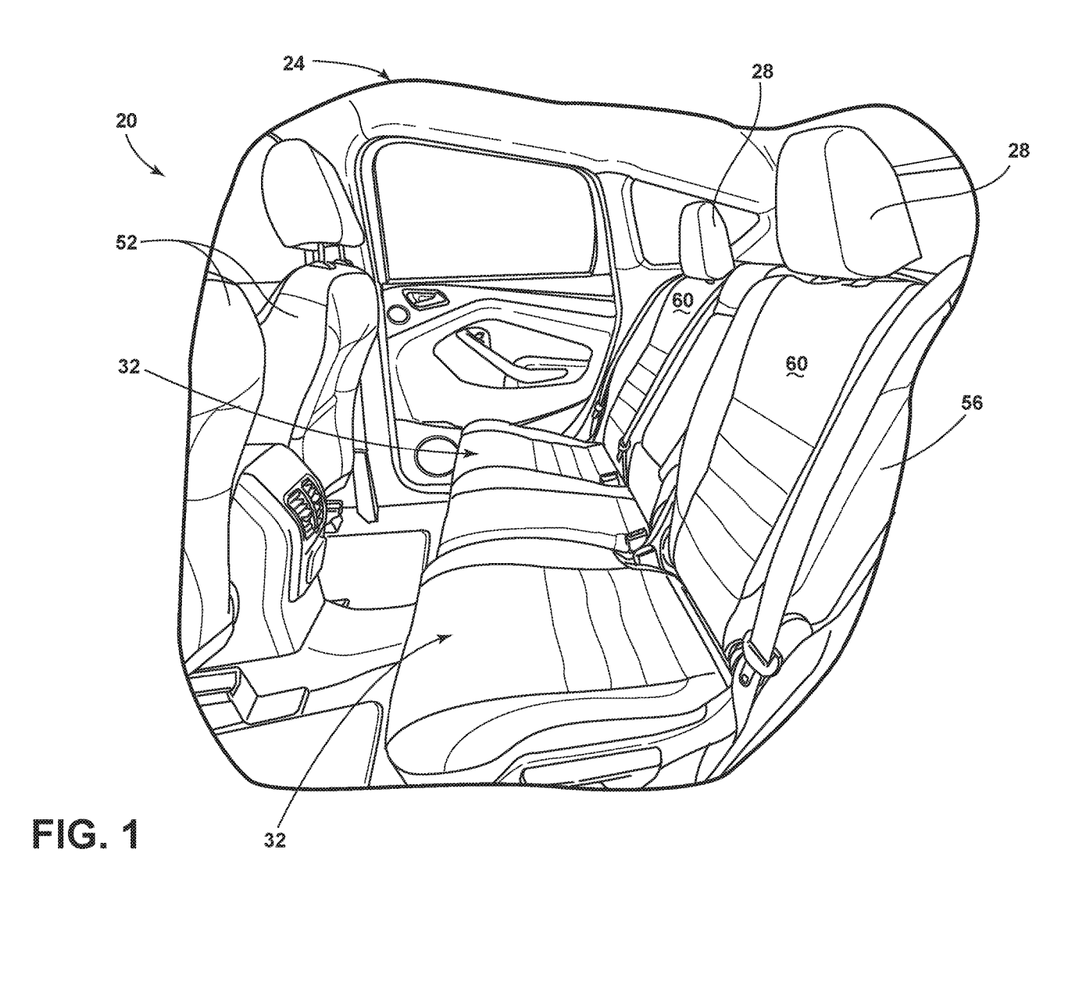
FIG. 1 is a side perspective view of a cabin of a vehicle illustrating a vehicle seating assembly, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage bin. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, reference numeral 20 generally indicates a vehicle. A cabin 24 of the vehicle 20 includes a vehicle seating assembly 28. The vehicle seating assembly 28 includes a seat 32 that is pivotable between an open position (FIG. 2) and a closed position (FIG. 1). A cavity 36 is formed in a support structure 40 of the seat 32 such that an occupant is supported on a support rib 44. The cavity 36 may be utilized as a storage bin. The cavity 36 is equipped with one or more compartments 48. The one or more compartments 48 may be a single compartment, may be multiple compartments that are separated from one another, may be multiple compartments that are partially bisected by dividers (e.g., the support ribs 44), and/or combinations thereof.

Referring again to FIG. 1, the cabin 24 of the vehicle 20 typically includes a front row 52 of seat assemblies and a rear row 56 of seat assemblies. The vehicle seating assembly 28 includes the seat 32, which is generally horizontal and configured to receive a seated occupant thereon, and a seatback 60, which may extend upright at an angle. The seatback 60 may be pivotally coupled to the seat 32. In some embodiments, the rear row 56 of seat assemblies may fold flat such that the seatback 60 pivots forward and rests on top of and directly abuts the seat 32. The seatback 60 of the rear row 56 of seat assemblies often is provided with a 60/40 split such that two of three seating positions in the rear row 56 of seat assemblies are provided with their seatbacks 60 integrally formed together while the third of three seating positions is independently operable. Accordingly, a user may selectively stow the seatback 60 in a forward dumped position while maintaining a portion of the seating capacity of the rear row 56 of seat assemblies.

Figure 2:
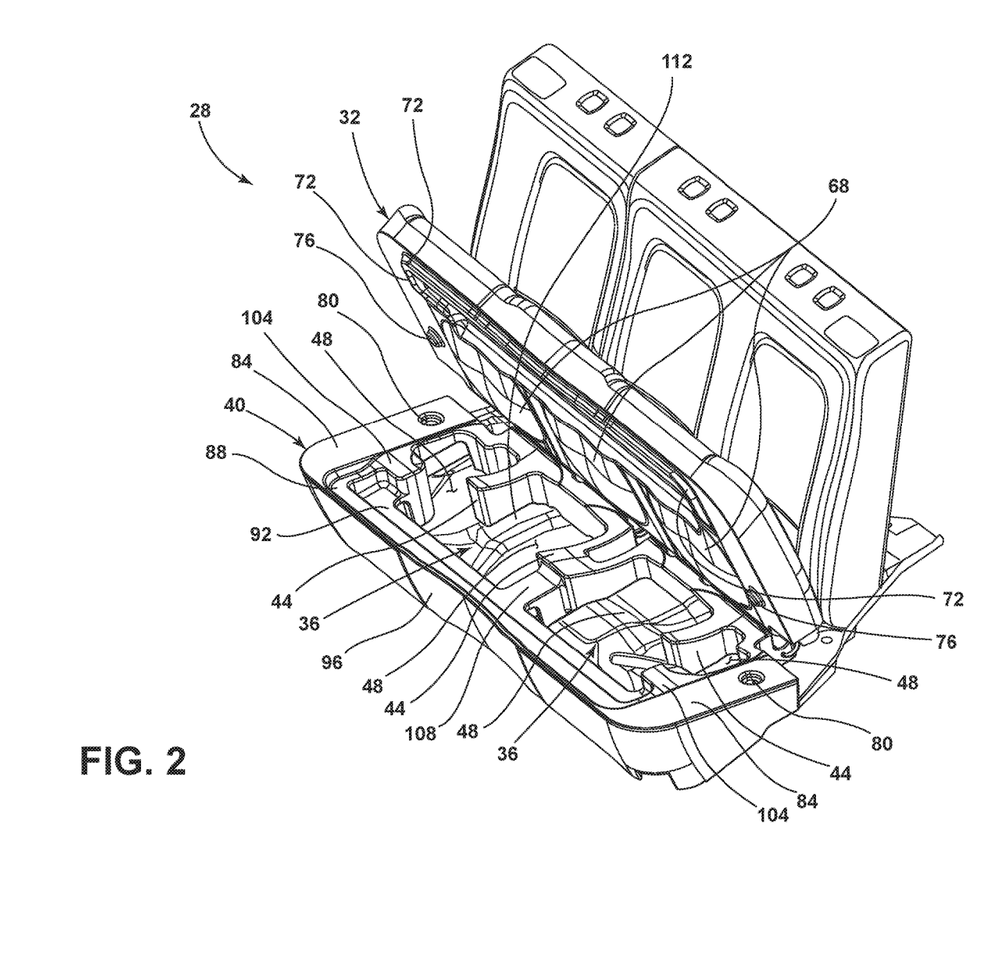
FIG. 2 is a top perspective view of the vehicle seating assembly illustrating a seat in an open position and a cavity in a support structure of the seat.
Figure 3:
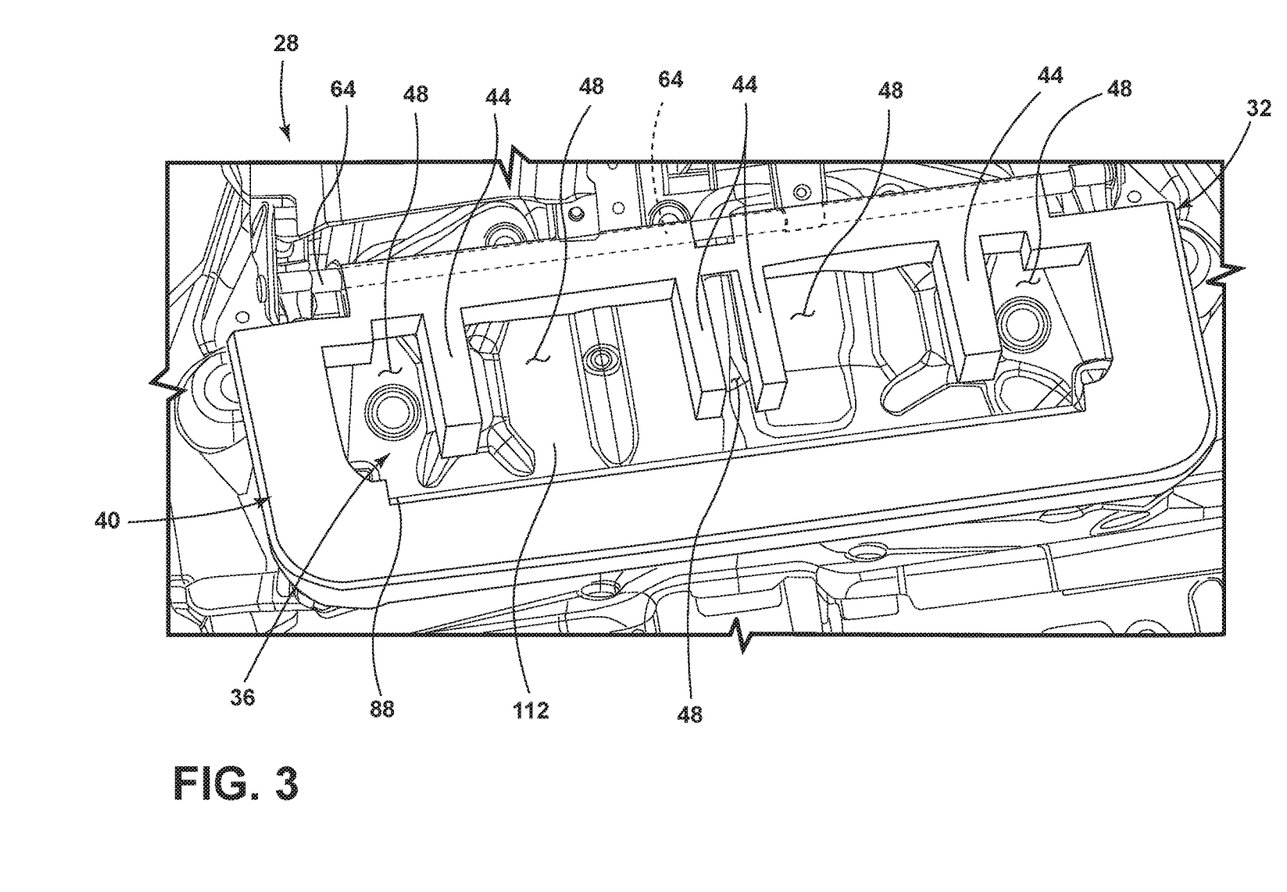
FIG. 3 is a top view of the cavity in the support structure of the seat illustrating a plurality of support ribs.

Referring to FIG. 2, the seat 32 is shown rotated upward to an open position such that the cavity 36 in the support structure 40 is exposed. The seat 32 may rotate about an axis that is transverse to the direction of travel of the vehicle 20. The rotational axis that the seat 32 rotates about may be defined by a seat frame bar 64 (FIG. 3). An underside of the seat 32 may include anti-submarine bowls 68 that aid in preventing an occupant from submarining in the vehicle seating assembly 28 during a vehicle impact event (e.g., a vehicle collision). The anti-submarine bowls 68 may be molded into the seat 32 in an integral fashion. For example, the anti-submarine bowl 68 may define a lower surface or support liner of the seat 32. The underside of the seat 32 may further include one or more retention ridges 72 and one or more positioning structures 76. The retention ridges 72 and/or the positioning structures 76 may prevent unintentional movement of the seat 32 relative to the support structure 40 in lateral and/or longitudinal directions (i.e., side-to-side and front-to-back motion). The retention ridges 72 may generally correspond to at least a portion of the cavity 36 in the support structure 40. For example, the retention ridges 72 may rest within at least a portion of the cavity 36 such that the retention ridges 72 correspond with or engage with a wall of the cavity 36 and extend from the underside of the seat 32 downward into the cavity 36.

Referring again to FIG. 2, the positioning structures 76 may correspond with positioning recesses 80 in the support structure 40. The positioning structures 76 may protrude from the underside of the seat 32 in a generally tapered or step-like fashion from a larger cross section at the underside of the seat 32 to a smaller cross section at a lower extreme of the positioning structures 76. The tapered and/or step-like configuration of the positioning structures 76 may aid in proper positioning and coupling of the positioning structures 76 with the positioning recesses 80. The positioning recesses 80 may have a generally complimentary configuration designed to receive the configuration of the positioning structures 76 such that the positioning structures 76 and the positioning recesses 80 are generally in continuous contact with one another when the seat 32 is in the closed position. The positioning recesses 80 may be positioned on a support ridge 84 of the support structure 40. The support ridge 84 of the support structure 40 may have a greater thickness at the sides of the support structure 40 than at a front of the support structure 40. The cavity 36 in the support structure 40 may include a forward shelf 88 that may receive the retention ridge 72 of the seat 32. The support structure 40 may be made from foam or foam-like material (e.g., expanded polypropylene, expanded polystyrene, and the like).

Referring further to FIG. 2, a forward compartment 92 of the cavity 36 may be located proximate a front wall 96 of the support structure 40. The forward compartment 92 may have a width that generally corresponds to the width of the cavity 36 and extends in an uninterrupted fashion from one side of the support structure 40 to the other side of the support structure 40. The forward compartment 92 may be substantially open to one or more of the compartments 48 that are positioned rearward of the forward compartment 92 in the cavity 36. The forward compartment 92 may include one or more rearward ledges 104 that extend from the side wall of the support structure 40 into the cavity 36. The rearward ledges 104 of the forward compartment 92 may aid in retaining items stored in the forward compartment 92. The forward compartment 92 may further include a central rib 108 that provides additional support to large items stored in the forward compartment 92. A rearward extreme of the central rib 108 may be further rearward than the rearward ledges 104 to provide additional clearance for items stored in the forward compartment 92 that have a greater width in a central portion of the item (e.g., riffles with scopes mounted thereto). A rearward extent of the central rib 108 may be defined by one of the support ribs 44 of the support structure 40. The forward compartment 92 of the cavity 36 may be recessed from a top surface of the support structure 40 and/or a top surface of the forward shelf 88. The compartments 48 of the cavity 36 may be formed by coring-away or removing sections of the support structure 40 thereby reducing the support structure 40 to the support ribs 44. The support ribs 44 may be positioned such that at least one support rib 44 is directly below a projected or calculated center or mass of an occupant of the vehicle seating assembly 28. The support ribs 44 may have a lateral thickness (i.e., parallel to the axis of rotation of the seat 32) that is in the range of at least about 10 mm to less than about 70 mm, at least about 20 mm to less than about 60 mm, at least about 30 mm to less than about 50 mm, and/or combinations or ranges thereof, including intermediate and singular values. A lower extent of the compartments 48 may be defined by a floor 112 of the vehicle 20.

Referring now to FIG. 3, the support structure 40 is shown according to another embodiment. The seat frame bar 64 that the seat 32 may pivot about is shown in partial phantom and may extend along a rearward most portion of the support structure 40. In the depicted embodiment, the positioning recesses 80 (FIG. 2) have been omitted. Accordingly, the seat 32 rests upon the support structure 40 without the aid of the positioning structures 76. The support structure 40 may include the forward shelf 88 of the cavity 36 that receives the retention ridge 72 (FIG. 2) of the seat 32. In such an embodiment, the retention ridge 72 may act as a positioning aid that properly aligns the seat 32 over the support structure 40 when the seat 32 is in the closed position. The cavity 36 may be generally symmetrical in shape. The compartments 48 of the cavity 36 may be configured with various sizes and contours. The forward compartment 92 of the cavity 36 may extend from the top surface of the support structure 40 downward to the floor 112 of the vehicle 20 (FIG. 1).

Figure 4:
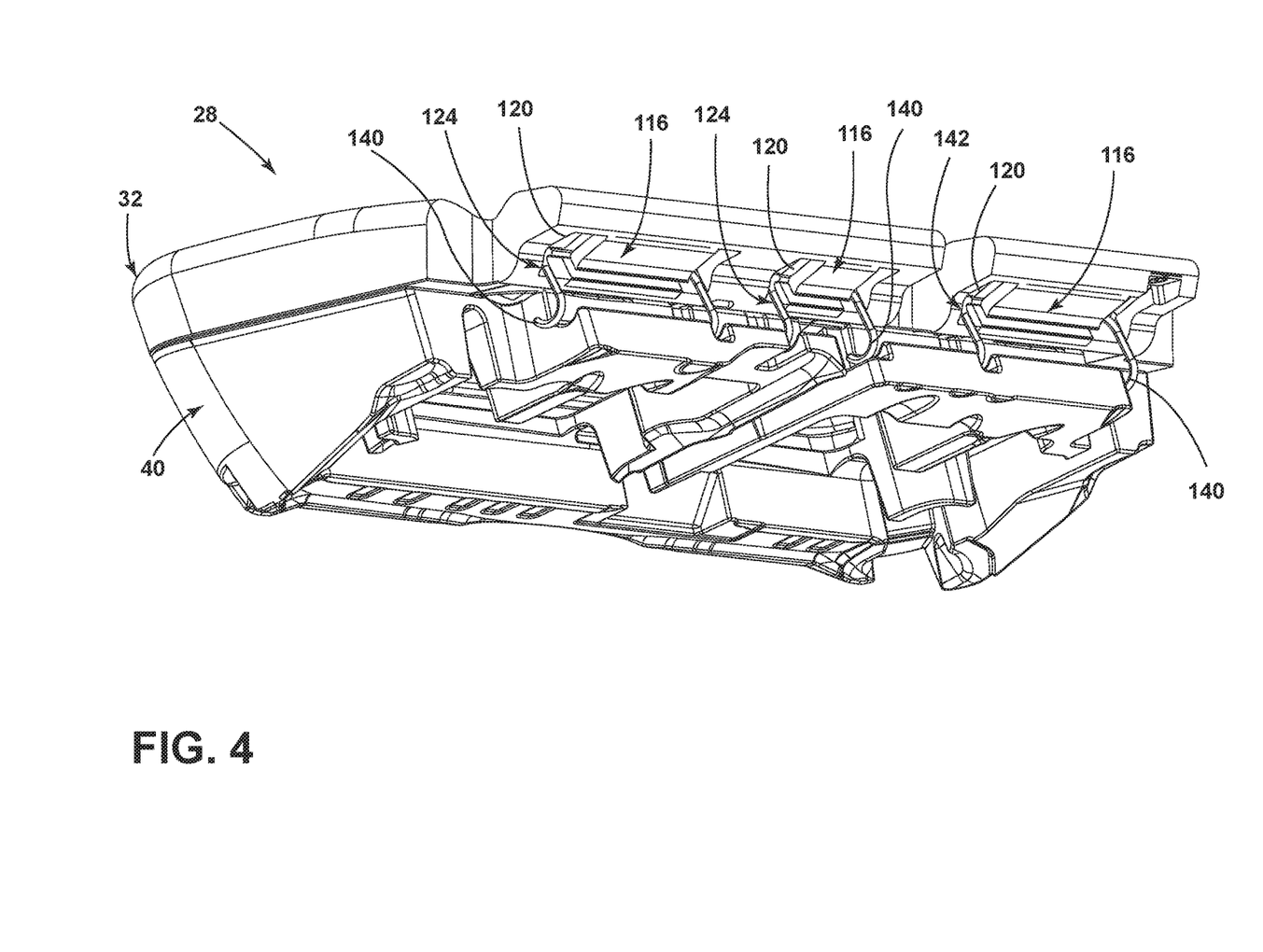
FIG. 4 is a bottom perspective view of the seat and the support structure illustrating channels and support wires that enable the pivotable motion of the seat relative to the support structure, according to one embodiment.
Figure 5:
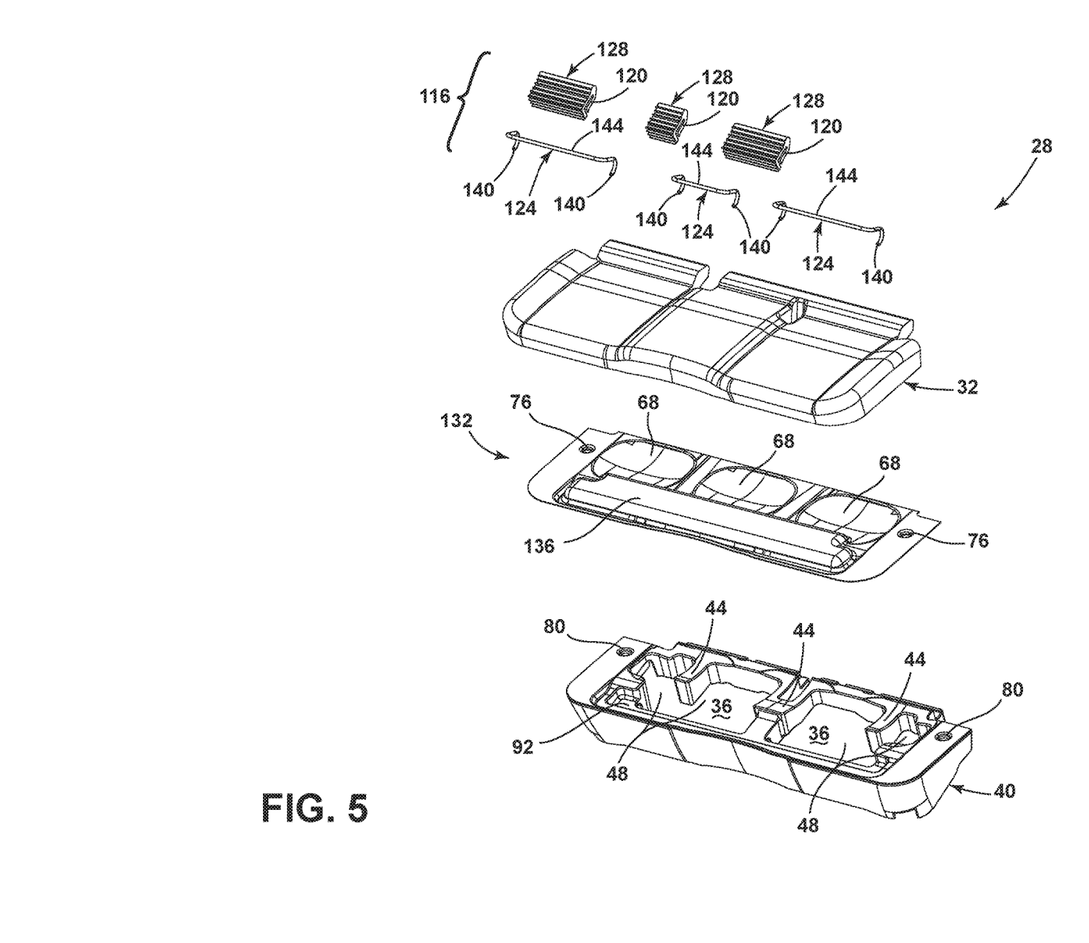
FIG. 5 is an exploded top perspective view of the seat and the support structure, according to one embodiment.
Figure 6:
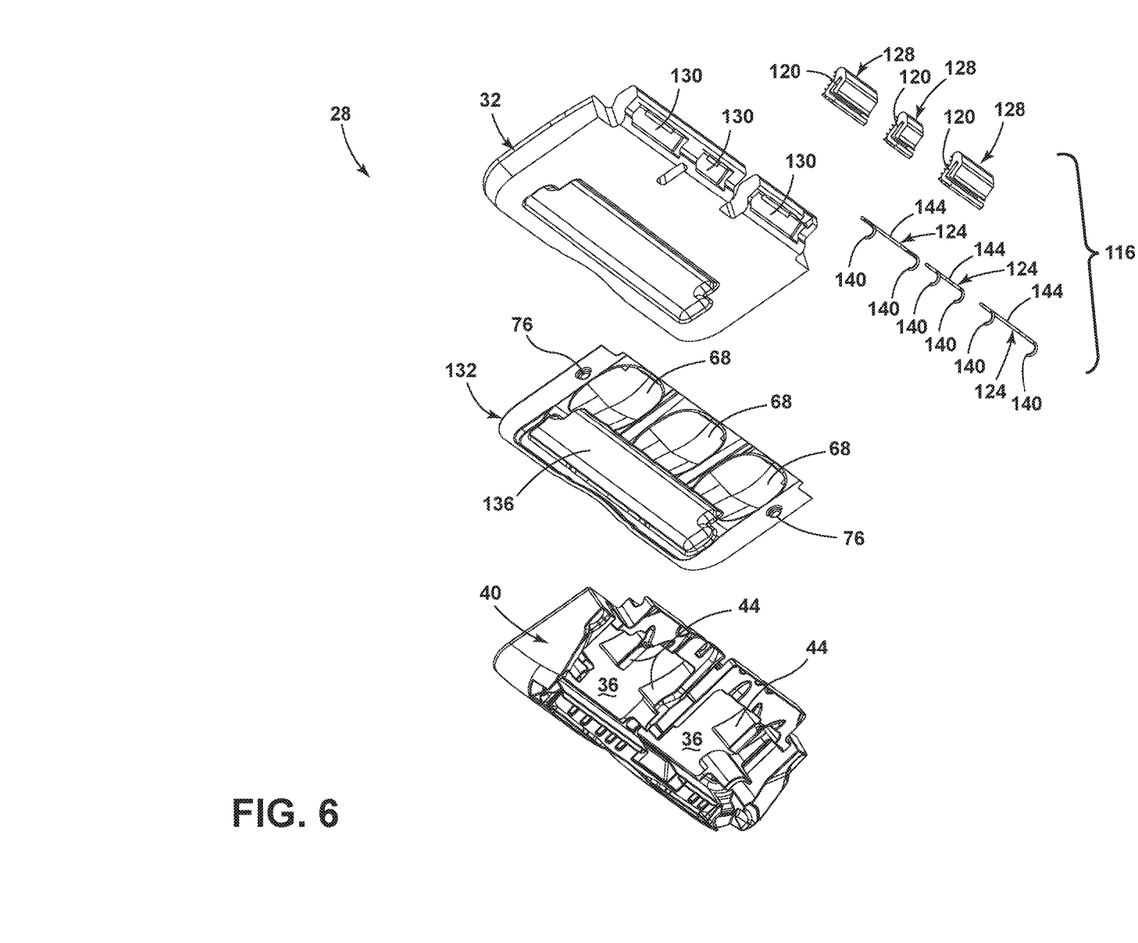
FIG. 6 is an exploded bottom perspective view of the seat and the support structure, according to the embodiment shown in FIG. 5.

Referring to FIGS. 4-6, the seat 32 is shown in the generally horizontal closed position over the support structure 40 (FIG. 4). The vehicle seating assembly 28 may further include one or more hinge assemblies 116 that operably couple the seat 32 to a seat frame, such as the seat frame bar 64 (FIG. 3). The hinge assembly 116 may further include channels 120 and support wires 124. In operation, the support wires 124 travel within the channels 120 as the seat 32 transitions between the open position and the closed position. The channels 120 may be formed in a coupling portion 128 of the hinge assembly 116. In some embodiments, the channels 120 of the hinge assembly 116 are integrally formed with the seat 32. In alternative embodiments, the channels 120 of the hinge assembly 116 may be formed in the coupling portion 128, which may be inserted into a preformed recess 130 in an underside of the seat 32. The anti-submarine bowls 68 may be integrally formed with a larger structure, such as a support liner 132. The support liner 132 may have a vertical thickness that is in the range of at least about 1 mm to less than about 20 mm, at least about 5 mm to less than about 15 mm, at least about 8 mm to less than about 12 mm, and/or combinations or ranges thereof, including intermediate and singular values. The support liner 132 may be constructed of a glass filled polymer. The support liner 132 may carry the positioning structures 76 for the seat 32 that mate with the positioning recesses 80 in the support structure 40. The support liner 132 may include a forward compartment aperture 136.

Referring again to FIGS. 4-6, the forward compartment aperture 136 increases the storage volume available in the forward compartment 92 of the cavity 36. Additionally, the forward compartment aperture 136 may expose items stored in the forward compartment 92 directly to a cushioning material of the seat 32 such that the item stored in the forward compartment 92 may deform the cushioning material of the seat 32. The deformation of the cushioning material of the seat 32 by the items stored in the forward compartment 92 may provide several benefits, which include, but are not limited to, preventing damage to the item stored in the front compartment 92 when users occupy the vehicle seating assembly 28, providing a customized and gentle positive retention of the item stored in the forward compartment 92 during vehicle maneuvers, etc. The cushioning material of the seat 32 may have a thickness of at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, and/or combinations or ranges thereof. In some embodiments, the forward compartment aperture 136 may be a forward compartment recess that does not expose items stored in the forward compartment 92 directly to the cushioning material of the seat 32. Instead, the forward compartment recess is a continuous portion of the support liner 132 that protrudes upward into the underside of the seat 32 such the storage volume available in the forward compartment 92 is increased. The anti-submarine bowls 68 are positioned to generally correspond with intended seating positions of the seat 32. The support wires 124 may be generally U-shaped and include hooked ends 140 that are positioned on either side of a central portion 144. The central portion 144 of the support wires 124 may generally resemble a towel-bar-like structure that has a substantially linear mid-section that extends outward toward the hooked ends 140 and transitions to the hooked ends 140 through a rounded turn (e.g., a rounded 90 degree turn). The support wires 124 may aid in retention of the seat 32 to the vehicle seating assembly 28 to prevent the seat 32 from sliding forward. In some embodiments, the seat 32 may further include a strap or other retention member that couples the seat 32 to the support frame of the vehicle seating assembly 28 (e.g., the seat frame bar 64).

Figure 7:
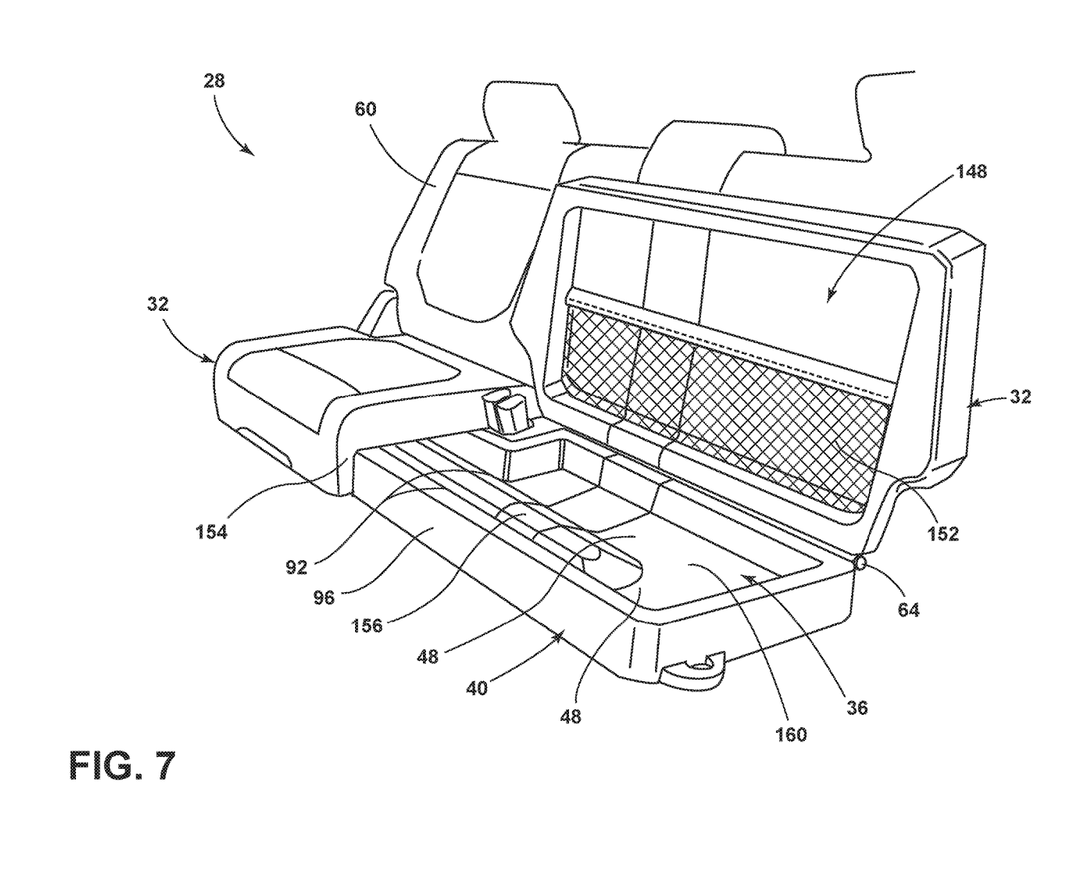
FIG. 7 is a side perspective view the vehicle seating assembly, according to another embodiment, illustrating the seat in the open position.

Referring now to FIG. 7, the vehicle seating assembly 28 is shown according to an alternative embodiment. The seat 32 may transition between the open position and the closed position by pivoting about an axis defined by the seat frame bar 64. The seat 32 may be designed with a 60/40 split similar to the seatback 60 such that a user may selectively rotate the seat 32 to reveal a portion of the cavity 36 without disturbing the remaining seating positions. The seat 32 may further include a supplemental storage area 148 in the underside of the seat 32. The supplemental storage area 148 may include a retention device 152, such as netting, that aids in the retention of items stored in the supplemental storage area 148 while the seat 32 is in the open and/or closed positions. The retention device 152 may be removable from the supplemental storage area 148. The seat 32 may extend over the front wall 96 of the cavity 36 when the seat 32 is in the closed position. The extension of the seat 32 over the front wall 96 of the support structure 40 may be referred to as a waterfall seat structure 154. In the depicted embodiment, the cavity 36 may include a sloped structure 156 that directs items stored in the cavity 36 rearward of the front wall 96 such that the items stored in the cavity 36 are prevented from exiting and/or falling out of the cavity 36 when the seat 32 is in the open and/or closed position. For example, the sloped structure 156 may help retain the items stored in the cavity 36 during vehicle maneuvers.

Referring again to FIG. 7, the forward compartment 92 of the cavity 36 may be located immediately rearward of the sloped structure 156 for storing long items. The additional compartments 48 of the cavity 36 may be located on vehicle outboard sides of the sloped structure 156 and/or rearward of the forward compartment 92. In some embodiments, the sloped structure 156 may be located in a central location of the cavity 36 such that the compartments 48 surround the sloped structure 156. In such an embodiment, items stored in the cavity 36 are encouraged to roll or shift towards the walls of the cavity 36 by the sloped structure 156. In alternative embodiments, the sloped structure 156 may be offset from the front wall 96 of the support structure 40 such that the forward compartment 92 of the cavity 36 is positioned between the sloped structure 156 and the front wall 96. In such an embodiment, the sloped structure 156 may have a substantially vertical forward wall such that a cross section of the forward compartment 92 is substantially rectangular. A lower surface 160 of the cavity 36 may be integrally formed with the support structure 40 rather than being defined by the floor 112 of the vehicle 20 (FIG. 3), as in some previous embodiments. The supplemental storage area 148 of the seat 32 may be generally recessed into the underside of the seat 32.

Figure 8:
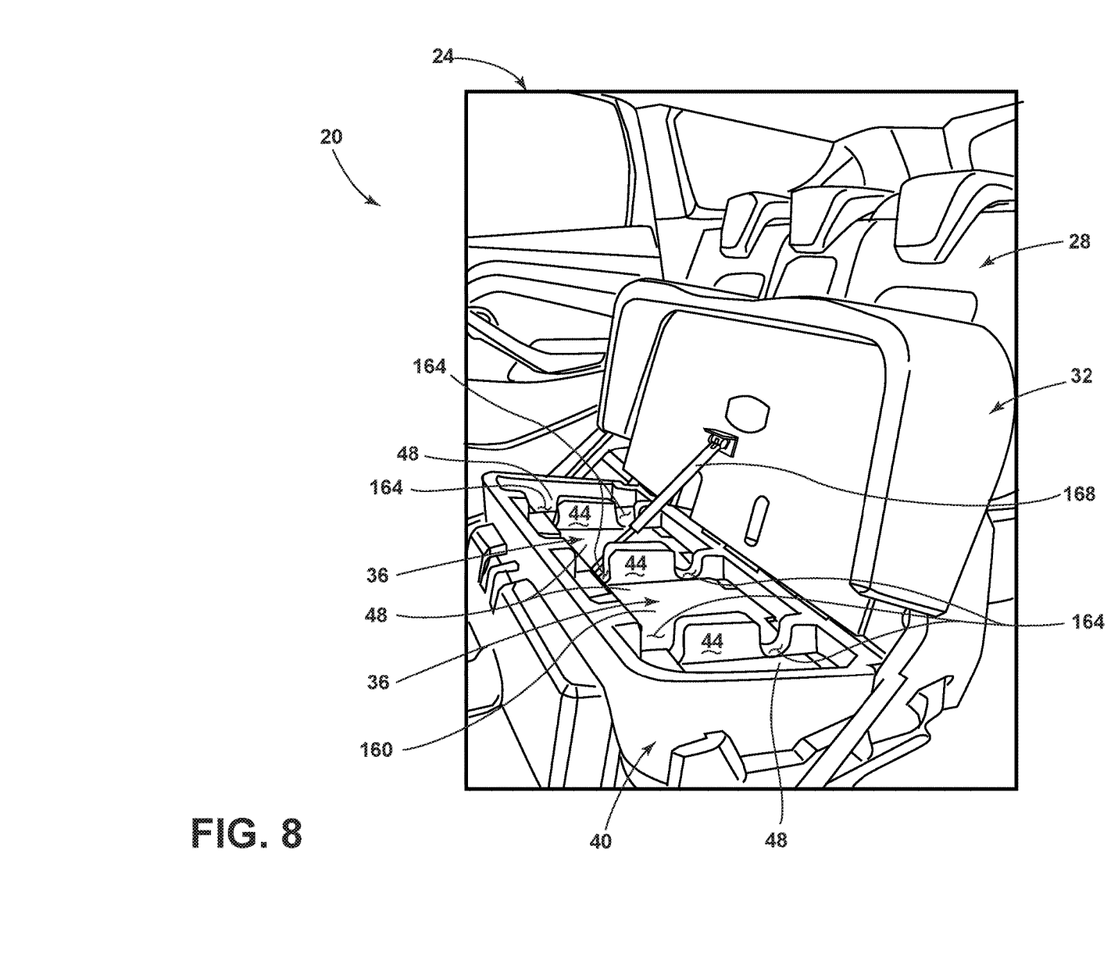
FIG. 8 is a side perspective view of the cabin of the vehicle illustrating the vehicle seating assembly with the seat in the open position, according to a further embodiment.

Referring to FIG. 8, the vehicle seating assembly 28 is shown with the seat 32 in the open position, according to another embodiment. The support ribs 44 of the support structure 40 may be provided with one or more slots 164. The slots 164 may be positioned in some or all of the support ribs 44. The slots 164 may serve the function of the forward compartment 92 in previous embodiments. That is, the slots 164 in the support ribs 44 may enable the storage of longer items in the cavity 36. For example, one or more riffles may be stored in the slots 164. The slots 164 may extend from a top surface of the support ribs 44 to the lower surface 160 or the floor 112. Alternatively, the slots 164 may extend from the top surface of the support ribs 44 downward to a depth in the support rib 44 that retains at least a portion of the support rib 44 below the slots 164. The compartments 48 of the cavity 36 are generally positioned between the support ribs 44 and the walls of the support structure 40. The compartments 48 may be of various sizes and contours. In some embodiments, the vehicle seating assembly 28 may be equipped with a prop bar 168 that is operably coupled to the seat 32. The prop bar 168 may be additionally coupled to the support structure 40. Alternatively, the prop bar 168 may be directly coupled only to the seat 32. In another alternative, the prop bar 168 may be directly coupled only to the support structure 40. In some embodiments, the prop bar 168 automatically deploys when the seat 32 is placed in the open position such that the seat 32 remains in the open position and is prevented from unintentional closing while a user is accessing the cavity 36. In other embodiments, the prop bar 168 may be manually deployed by a user when the seat 32 is placed in the open position. In general, the prop bar 168 is configured to provide a brace that supports the weight of the seat 32 when the seat 32 is in the open position. For example, the prop bar 168 may be in physical contact with the seat 32 and the support structure 40 to provide the resistance to unintentional closure of the seat 32 while the user is accessing the cavity 36. In various embodiments, the prop bar 168 may engage with a detent or recess in the seat 32 or the support structure 40 to provide the resistance to unintentional closure of the seat 32. The prop bar 168 may be, for example, a gas piston. In the depicted embodiment, the seat 32 extends over and around the walls of the support structure 40 when the seat 32 is in the closed position. Said another way, the support structure 40 is configured to nest within exterior walls of the underside of the seat 32.

In the various embodiments discussed herein, the vehicle seating assembly 28 may be equipped with a lock that allows the user to safely and securely store items in the cavity 36 by locking the seat 32 in the closed position. The lock may take various forms which include, but are not limited to, a keyed lock, a combination lock, a biometric recognition lock, and the like. While the seat 32 has been depicted as opening in a rearward direction by pivoting upwards towards the seatback 60, it is contemplated that in alternative embodiments the cavity 36 may be accessed by opening the seat 32 in an upward direction away from the seatback 60. In such an embodiment, one or more brackets or hinges may be provided on the front wall 96 of the support structure 40 that operably couple the seat 32 to the support structure 40 in a pivotable fashion without departing from the concepts disclosed herein. In some embodiments, the top surface of the support structure 40 and/or the support rib 44 may include a "skin" that is grained with a predetermined pattern. The predetermined pattern may be, for example, a carbon fiber pattern, a leather pattern, or the like. The skin may be directly formed on the top surface of the support structure 40 and/or the support rib 44 rather than being a separate portion. The predetermined pattern of the skin may be aesthetically pleasing to the user such that the material that the support structure 40 and/or the support rib 44 are made of may be exposed when the user accesses the cavity 36. Accordingly, manufacture of the vehicle seating assembly 28 may be simplified. Additionally, the skin may increase the strength and rigidity of the support structure 40 and/or the support ribs 44.

The support structure 40 of vehicle seating assemblies 28 is often an important aspect in providing occupant safety during impact events, such as vehicle collisions. Therefore, the support structure 40 is often provided as a continuous member in the seat 32. However, the present disclosure provides a storage bin in the form of the cavity 36 that is created by reducing or removing a substantial portion of the support structure 40 while meeting anti-submarining and frontal crash dynamic integrity requirements. Additionally, the comfort of the occupant of the vehicle seating assembly 28 may remain unchanged as a result of the decrease in supporting material. The storage bin may be utilized for storing any number of items, including, but not limited to, an ice scraper, additional clothing, shoes, emergency kits, sporting equipment, etc.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seat that is pivotable between open and closed positions;
   a hinge assembly having support wires that travel within channels as the seat transitions between the open and closed positions; and
   a cavity formed in a support structure of the seat and defining a support rib such that an occupant is supported on the support rib.

2. The vehicle seating assembly of claim 1, wherein the support rib is positioned directly below a projected center of mass of the occupant.

3. The vehicle seating assembly of claim 1, wherein the channels of the hinge assembly are integrally formed with the seat.

4. The vehicle seating assembly of claim 1, wherein the support rib further comprises:
   a skin that is grained with a predetermined pattern.

5. The vehicle seating assembly of claim 1, wherein the seat further comprises:
   a supplemental storage area in an underside of the seat.

6. The vehicle seating assembly of claim 1, wherein the seat extends over a front wall of the cavity when the seat is in the closed position.

7. The vehicle seating assembly of claim 1, further comprising:
   a prop bar operably coupled to the seat, wherein the prop bar automatically deploys when the seat is placed in the open position such that the seat remains in the open position.

8. A vehicle seating assembly, comprising:
   a seat that is pivotable about a hinge assembly that has support wires that travel within channels as the seat transitions between open and closed positions; and
   one or more compartments created by removing at least a portion of a support structure of the seat thereby reducing the support structure to one or more support ribs.

9. The vehicle seating assembly of claim 8, wherein the support ribs are positioned such that at least one support rib is directly below a projected center of mass of an occupant.

10. The vehicle seating assembly of claim 8, wherein the channels of the hinge assembly are integrally formed with the seat.

11. The vehicle seating assembly of claim 8, further comprising:
    a seatback pivotably coupled to the seat.

12. A vehicle seating assembly, comprising:
    a seat that is pivotable between open and closed positions;
    a hinge assembly that operably couples the seat to a seat frame, wherein the hinge assembly comprises support wires that travel within channels as the seat transitions between the open and closed positions;
    a support structure; and
    a cavity created by removing at least a portion of the support structure, thereby reducing the support structure to one or more support ribs, wherein the one or more support ribs have a skin that is grained with a predetermined pattern.

13. The vehicle seating assembly of claim 12, wherein the support ribs are positioned such that at least one support rib is directly below a projected center of mass of an occupant.

14. The vehicle seating assembly of claim 12, wherein the channels of the hinge assembly are integrally formed with the seat.

* * * * *

UNITED STATES PATENT AND TRADEMARK OFFICE
CERTIFICATE OF CORRECTION

PATENT NO. : 10,232,788 B1
APPLICATION NO. : 15/705805
DATED : March 19, 2019
INVENTOR(S) : Hagedorn et al.

Page 1 of 1

It is certified that error appears in the above-identified patent and that said Letters Patent is hereby corrected as shown below:

On the Title Page

"(72) Inventors: Gregory Hagedorn, Bloomfield Hills, MI (US); Kevin Wayne Preuss, Berkley, MI (US); Steven Camago, Clinton Township, MI (US); Jimmy Moua, Canton, MI (US); Johnathan Andrew Line, Northville, MI (US); Adam Ewel, Royal Oak, MI (US)" should read:

--(72) Inventors: Gregory Hagedorn, Bloomfield Hills, MI (US); Kevin Wayne Preuss, Berkley, MI (US); Steven Carnago, Clinton Township, MI (US); Jimmy Moua, Canton, MI (US); Johnathan Andrew Line, Northville, MI (US); Adam Ewel, Royal Oak, MI (US)--.

Signed and Sealed this
Twenty-first Day of May, 2019

Andrei Iancu
*Director of the United States Patent and Trademark Office*